(No Model.) 2 Sheets—Sheet 1.
E. CLIFF.
CENTER BEARING FOR CAR TRUCKS.
No. 576,255. Patented Feb. 2, 1897.
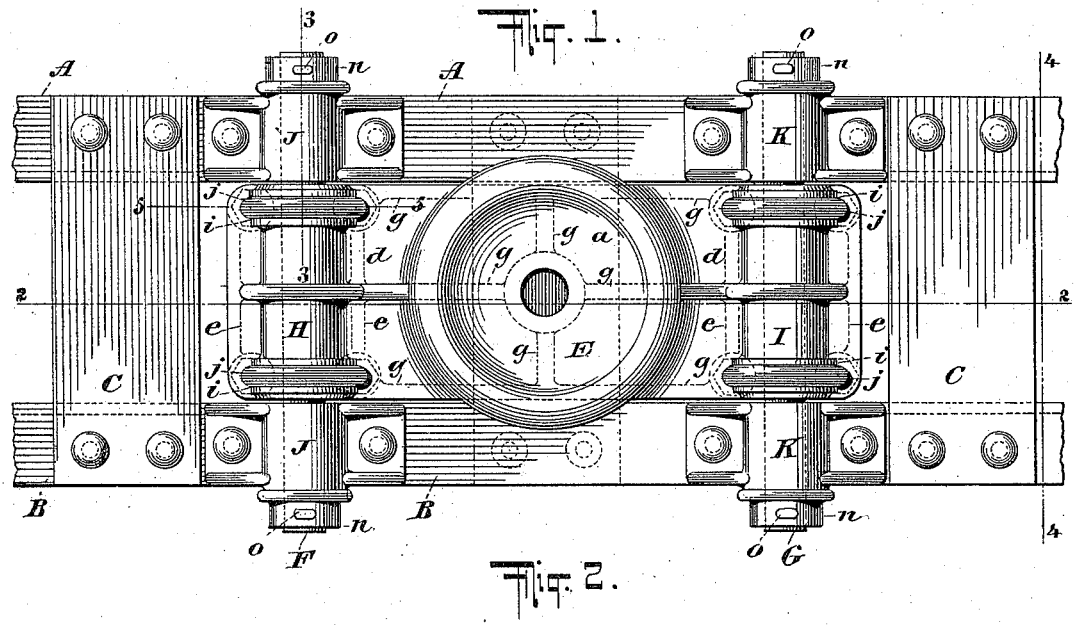
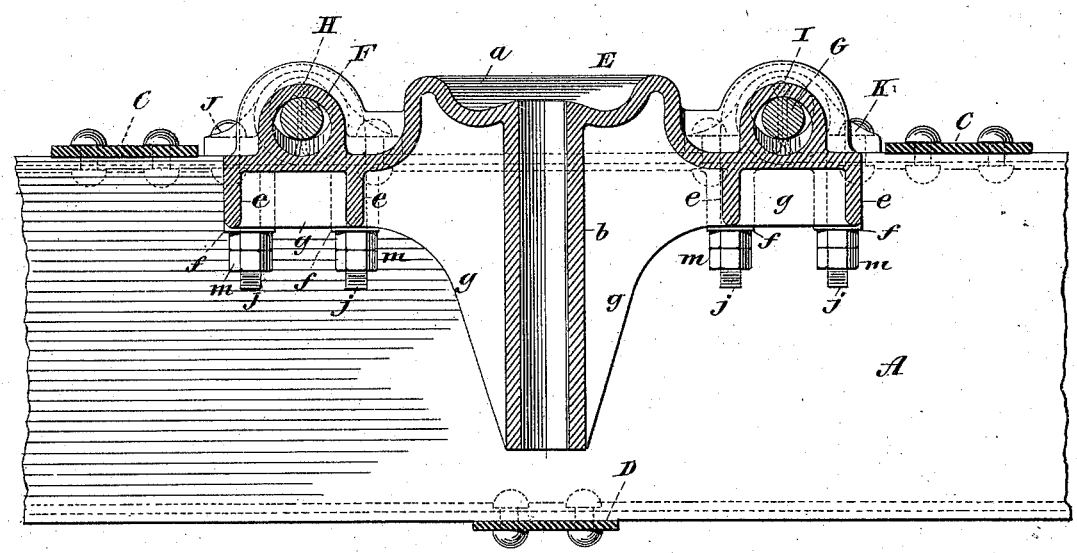
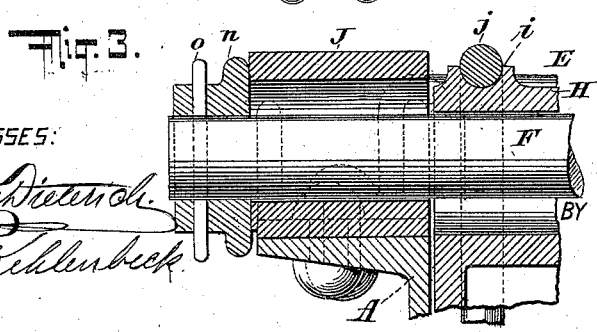
WITNESSES:
Gustave Dietrich
John Kehlenbeck
INVENTOR
Edward Cliff.
BY
Chas. C. Gill
ATTORNEY.

(No Model.) 2 Sheets—Sheet 2.
E. CLIFF.
CENTER BEARING FOR CAR TRUCKS.
No. 576,255. Patented Feb. 2, 1897.
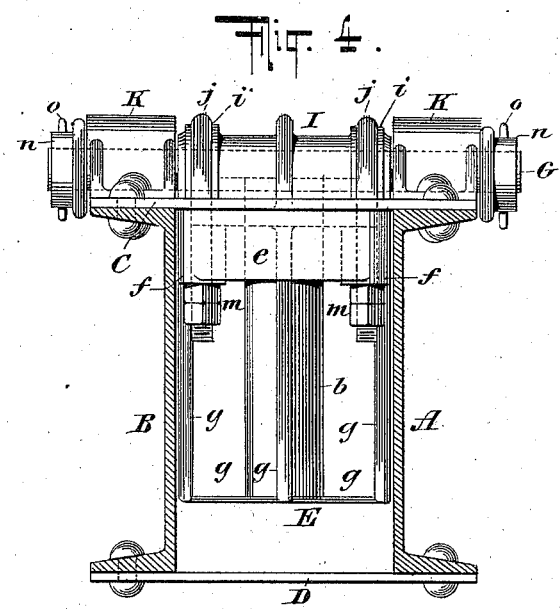
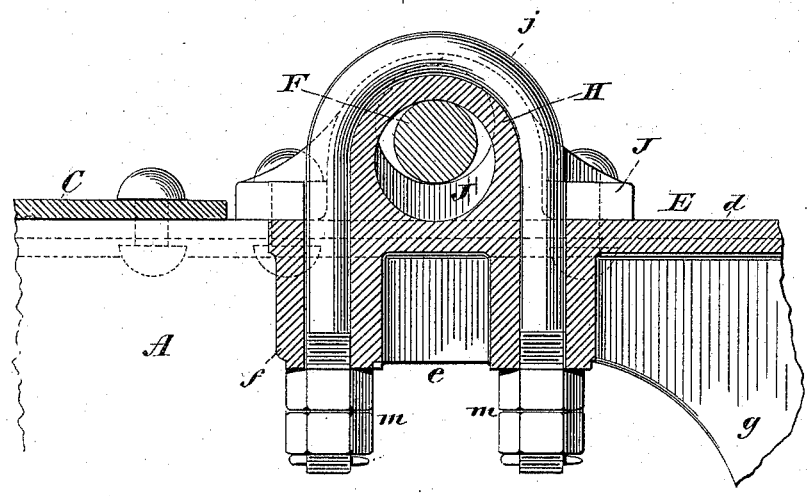
WITNESSES:
Gustave Dieterich.
John Kehlenbeck.
INVENTOR
Edward Cliff,
BY
Chas. C. Gill
ATTORNEY.

UNITED STATES PATENT OFFICE.

EDWARD CLIFF, OF NEWARK, NEW JERSEY.

CENTER BEARING FOR CAR-TRUCKS.

SPECIFICATION forming part of Letters Patent No. 576,255, dated February 2, 1897.

Application filed October 30, 1896. Serial No. 610,522. (No model.)

*To all whom it may concern:*

Be it known that I, EDWARD CLIFF, a citizen of the United States, and a resident of Newark, in the county of Essex and State of New Jersey, have invented certain new and useful Improvements in Center Bearings for Car-Trucks, of which the following is a specification.

The invention relates to improvements in car-trucks; and it consists in the novel center bearing hereinafter described and claimed applied to the bolster or transverse beams of the truck and receiving the center pin or king-bolt connected with the truck-body.

The center bearing embodying my invention is applicable to trucks generally, and especially to trucks having rigid side frames connected by a bolster or bolsters, and in carrying my invention into effect I provide a center-bearing frame, saddle, or body which receives the king-bolt and bearing-plate connected with the truck-body, and which saddle, body, or frame is supported at its ends upon transverse shafts whose ends are journaled on the beams constituting the bolster, the relations of the parts to one another being such that the bearings for the ends of said shafts are out of central alinement with the bearings on the center-bearing frame for said shafts and that said shafts in their bearings may roll laterally, without shock, with the center-bearing frame or body and return to their normal position.

The invention will be fully understood from the detailed description hereinafter presented, reference being had to the accompanying drawings, in which—

Figure 1 is a top view of the central portion of a bolster provided with a center bearing constructed in accordance with and embodying the invention. Fig. 2 is a central vertical longitudinal section of same on the dotted line 2 2 of Fig. 1. Fig. 3 is an enlarged vertical transverse section through a portion of same on the dotted line 3 3 of Fig. 1. Fig. 4 is a vertical transverse section of same on the dotted line 4 4 of Fig. 1, and Fig. 5 is an enlarged vertical longitudinal section through a portion of same on the dotted line 5 5 of Fig. 1.

In the drawings, A B respectively designate parallel flanged beams separated from one another and forming the bolster for a car-truck. In use the ends of the beams A B will be rigidly secured to the side beams or frames of the truck, and the bolster composed of said beams will extend transversely across the truck and connect said side beams or frames. The beams A B will be of any suitable form, and in the present instance I illustrate them as being of channel shape and provided with the connecting-plates C C and D, the latter being at the lower side of the bolster and more clearly illustrated in Figs. 2 and 4. The invention is not, however, limited to the form of the beams A B nor to the use of the connecting-plates C C D.

The present invention pertains wholly to the center bearing, which in itself is yielding laterally of the truck and longitudinally of the bolster and is supported from the latter.

The plate, casting, frame, or body composing the center bearing proper is indicated by the letter E and is located intermediate the vertical planes of the beams A B, being supported at its ends by the transverse shafts F G, which pass through the bearings or sleeves H I, provided at the ends of the frame or body E, as illustrated in Figs. 2 and 3, and are journaled at their ends in the bearings J J and K K, which are rigidly secured upon the beams A B, as shown in Fig. 1. The apertures through or bores of the bearings H I of the frame or body E are of considerably greater diameter than the diameter of the shafts F G, and hence, as illustrated in Figs. 2 and 3, the frame or body E rests directly upon the said shafts F G, and the latter are at the upper part of said bearings H I, the upper inner surface of the latter resting directly upon the upper surfaces of the shafts F G.

The bearings H I are in the nature of sleeves, which may be cast upon the frame or body E, and the latter in its form shown is a casting having the upper bearing, plate, or surface $a$, the vertical sleeve $b$ to receive the king-bolt, and the lateral extensions $d\,d$, (see Fig. 1,) at whose ends are the sleeves or bearings H I, and from whose lower surface depend the transverse flanges $e$ (see Fig. 2) and the studs $f\,f$, (see Fig. 5,) the depending end portions of the body or frame E being connected with the central sleeve $b$ and plate $a$ by means of the web-flanges $g$. (Shown by full lines in Fig. 2 and by dotted lines in Fig. 1.)

While in the construction illustrated in the drawings I show the body E in an integral form or piece, I do not limit the invention in its broader scope to any special form or construction of the said body E. Adjacent to the ends of the sleeves or bearings H I are formed the grooves $i$ to receive the looped or bent portion of the bolts $j$, the latter, as more clearly illustrated in Fig. 5, being in the shape of an inverted U and having its ends extending downward through the lugs $f$ and receiving the nuts $m$. The bolts $j$ are four in number, one being adjacent to each end of each of the sleeves or bearings H I, and the said bolts $j$ are simply used for giving increased strength to the frame or body E and as a means of retaining the said frame or body E in position in case through accident or otherwise the upper portions of the sleeves or bearings H I should in use become fractured.

The bearings J J and K K are rigidly secured to the beams A B, and they are each preferably formed in one integral piece, as shown; but the invention is not limited to any special form or construction of the sleeves or bearings J K other than that the center of the interior bore of same shall be out of alinement with the center of the interior bore of the bearings or sleeves H I and in diameter greater than the diameter of the shafts F G.

It has been described above that the center-bearing body or frame E rests upon the shafts F G, the latter being in the upper portion of the sleeves or bearings H I thereof, and upon reference to Figs. 3 and 5 it will be apparent that the ends of the shafts F G are at the lower portion of the bearings J K, the ends of said shafts being directly supported upon the lower portion of said bearings J K. It will also be observed upon reference to Figs. 3 and 5 that the bore of the bearings J K is above and eccentric to the bore of the bearings H I, whereby, as more clearly indicated in Fig. 5, the said shafts F G are confined within substantially elliptical boundaries, the longer axis of the ellipse being parallel with the upper surface of the bolster or beams A B. The ends of the shafts F G are retained by the caps $n$ and pins $o$, the said caps closing the outer ends of the bearings J K.

The center-bearing frame or body E is, as illustrated in Fig. 1, supported intermediate the vertical planes of the beams A B solely upon the shafts F G, and the said center-bearing frame or body E in use will receive the king-bolt and operate as the central bearing for the car-body.

The object of the center bearing arranged and constructed as described is to afford a laterally-yielding connection intermediate the car-body and the truck-frame, and in accordance with my invention I accomplish this result without the use of springs, the construction presented allowing the car-body to yield laterally toward either side of the car-truck, arresting the lateral movement without shock, and compelling the car-body to automatically return to its central position.

In the construction presented the lateral movement of the center bearing is permitted from the fact that the bore of the bearings J K and H I are out of alinement with one another and are greater in diameter than the diameter of the shafts F G. The peculiar relations of the bearings J K with the bearings H I are such that, as illustrated in Figs. 2 and 5, any lateral movement of the center-bearing frame or body E causes the shafts F G to roll up the sides of the bearings J K, which sides, being in the nature of inclines, retard within proper limits the lateral movement of the center-bearing frame E and compel a return of the shafts to their lower normal position, the return of the shafts to their lower normal position forcing a return of the center bearing or frame E to its normal position. During the movement of the center bearing E the shafts F G operate as rollers or roll in their bearings, and the said center bearing not only moves with said shafts or rollers, as they then become, in the sense of being carried by them, but rolls on said shafts as rollers. Thus the center bearing E will have a substantially horizontal movement equal to about twice the displacement of the rollers or shafts; or, in other words, if the rollers or shafts travel one-quarter of an inch from their normal position they bodily carry the center bearing that distance, and at the same time, since the rollers or shafts are rolling in the same direction the center bearing E is moving, said center bearing will in addition have a one-quarter-inch movement on the rollers. Thus, while the shafts or rollers may only roll one-quarter of an inch, the center bearing E will move one-half an inch.

The longitudinal line of center of the shafts F G is at one side of the center of the bearings J K and at the opposite side of the center of the bearings H I, and hence the bearings for the ends of said shafts are eccentric to the bearings for the middle portions of said shafts.

I much prefer that the interior bores of the bearings J K and H I be circular, but it is by no means essential that said bores be absolutely circular, as more or less satisfactory results may be obtained when the said bores are in the form of horizontal ellipses, which will allow the shafts F G to roll up the curved or inclined sides and return to position, and it is apparent that the spirit and operation of my invention would be preserved if the bottom of the bearings H I and top of the bearings J K were cut open to destroy the continuity of surface or break the circles.

The invention is not limited to the special circular bearings shown, but comprises all modifications thereof which admit of the shafts F G rolling on the curved or inclined contacting surfaces of the bearings. The shafts F G are confined against undue movement while rolling, and they are in contact with curved or inclined surfaces which yieldingly resist the movement of the center bearing E and send the latter back to its normal position.

The invention made the subject of this application is believed to be broadly new and generic, and this application is not limited to details of form or construction.

What I claim as my invention, and desire to secure by Letters Patent, is—

1. In a car-truck, the supporting-beams, the bearings supported thereby, and the shafts whose ends are retained in said bearings, combined with the center-bearing frame or body having bearings at its ends receiving the middle portions of said shafts and being out of central alinement with said first-mentioned bearings and of a bore in diameter greater than the diameter of said shafts; substantially as set forth.

2. In a car-truck, the supporting-beams, the end bearings supported thereby, and the shafts whose ends are retained in said bearings, combined with the center-bearing frame or body having bearings at its ends receiving the middle portions of said shafts and being out of central alinement with said end bearings, the latter bearings having a bore in diameter greater than the diameter of said shafts; substantially as set forth.

3. In a car-truck, the supporting-beams, the end bearings supported thereby, and the shafts whose ends are retained in said bearings and whose diameter is substantially less than the diameter of the bore of said bearings, combined with the center-bearing frame or body having bearings at its ends to receive the middle portions of said shafts and having a bore in diameter substantially greater than the diameter of said shafts; substantially as set forth.

4. In a car-truck, the supporting-beams, the end bearings supported thereby, and the shafts whose ends are retained in said bearings and in diameter are substantially less than the diameter of the bore of said bearings, combined with the center-bearing frame or body having end bearings receiving and substantially greater in diameter than the middle portions of said shafts, the said end bearings and the said bearings on said frame or body being out of alinement with one another; substantially as set forth.

5. For car-trucks having the supporting-beams extending transversely across from one side to the other of the truck, the center-bearing frame or body suspended on and intermediate said beams and having at its ends the bearings, combined with the transverse shafts or rollers in said bearings and on which said center-bearing frame or body is loosely suspended, and the bearings on said beams loosely receiving the ends of said shafts or rollers and being at the opposite ends of but out of central alinement with said bearings on the center-bearing frame or body; substantially as set forth.

6. For car-trucks, the center-bearing frame or body having the bearings at its ends, combined with the transverse shafts or rollers held within said bearings and on which shafts or rollers said frame or body is loosely suspended, and the rigid bearings supported from the truck-frame to loosely receive the ends of said shafts or rollers and being at the opposite ends of but out of central alinement with the said bearings on the center-bearing frame or body; substantially as set forth.

7. In a car-truck, the supporting-beams, the bearings thereon, and the transverse roller-shafts loosely confined in said bearings, combined with the center-bearing frame having the bearings loosely receiving the middle portions of said shafts, said center-bearing frame being a casting comprising the central vertical sleeve, the upper bearing-plate, the transverse end depending flanges and the web-flanges connecting said sleeve-flanges and plate; substantially as set forth.

Signed at New York, in the county of New York and State of New York, this 29th day of October, A. D. 1896.

EDWARD CLIFF.

Witnesses:
 CHAS. C. GILL,
 E. JOS. BELKNAP.